(12) United States Patent
Fanfelle et al.

(10) Patent No.: US 12,237,682 B2
(45) Date of Patent: Feb. 25, 2025

(54) EFFICIENT HIERARCHICAL DISTRIBUTED POWER STORAGE

(71) Applicant: BreakEats LLC, Sunnyvale, CA (US)

(72) Inventors: Robert James Fanfelle, San Carlos, CA (US); Ezra Robert Gold, Sunnyvale, CA (US)

(73) Assignee: BreakEats LLC, Sunnyvale, CA (US)

( * ) Notice: Subject to any disclaimer, the term of this patent is extended or adjusted under 35 U.S.C. 154(b) by 117 days.

(21) Appl. No.: 17/772,982

(22) PCT Filed: Oct. 28, 2020

(86) PCT No.: PCT/US2020/057777
§ 371 (c)(1),
(2) Date: Apr. 28, 2022

(87) PCT Pub. No.: WO2021/086994
PCT Pub. Date: May 6, 2021

(65) Prior Publication Data
US 2023/0040172 A1    Feb. 9, 2023

Related U.S. Application Data

(63) Continuation-in-part of application No. 16/665,497, filed on Oct. 28, 2019, now abandoned.

(51) Int. Cl.
*H02J 3/32* (2006.01)
*H02J 3/01* (2006.01)
*H02M 1/42* (2007.01)

(52) U.S. Cl.
CPC .................... *H02J 3/32* (2013.01);
*H02J 3/01* (2013.01); *H02M 1/4208* (2013.01)

(58) Field of Classification Search
CPC ............ H02J 3/32; H02J 3/01; H02M 1/4208
See application file for complete search history.

(56) References Cited

U.S. PATENT DOCUMENTS

| 6,181,113 B1 | 1/2001 | Hu et al. |
| 7,595,613 B2 | 9/2009 | Thompson et al. |
| 2010/0244781 A1 | 9/2010 | Kramer et al. |
| 2011/0187197 A1* | 8/2011 | Moth ............... H02J 9/062 307/66 |
| 2014/0177293 A1 | 6/2014 | Eckhardt et al. |

(Continued)

FOREIGN PATENT DOCUMENTS

| AU | 2016275411 A1 | 2/2018 |
| CN | 108761354 A | 11/2018 |

(Continued)

OTHER PUBLICATIONS

PCT/US20/57777 International Search Report, Jan. 28, 2021.
(Continued)

*Primary Examiner* — Alfonso Perez Borroto
*Assistant Examiner* — Esayas G Yeshaw
(74) *Attorney, Agent, or Firm* — Carnelian Law, LLC

(57) ABSTRACT

An electrical energy storage device for use in an electrical distribution grid where storage may be located across various voltage transitions throughout the network, enabling energy to bypass stepdown transformers, monitoring on both sides of a transformer, and power conditioning to optimize transformer and grid performance.

20 Claims, 12 Drawing Sheets

(56) References Cited

U.S. PATENT DOCUMENTS

2015/0069844 A1    3/2015  Wu et al.
2016/0079759 A1    3/2016  Mardapittas
2019/0312441 A1*  10/2019  Ballantine ................. H02J 3/14

FOREIGN PATENT DOCUMENTS

| EP | 3303922 A1 | 4/2018 |
| EP | 3309922 A1 | 4/2018 |
| JP | 2017005931 A | 1/2017 |
| JP | 6532018 B2 | 6/2019 |
| NZ | 738870 A | 2/2019 |
| WO | 2016199380 A1 | 12/2016 |

OTHER PUBLICATIONS

PCT/US20/57777 Written Opinion of the International Searching Authority Jan. 28, 2021.
European Office Action 20817537.2 dated Mar. 14, 2024.

\* cited by examiner

| SEQUENCE | STORAGE OPERATION | SWITCH STATE | | | |
|---|---|---|---|---|---|
| | | 710 | 712 | 714 | 716 |
| 1 | STEADY STATE STORAGE | 0 | 0 | 0 | 0 |
| 2 | CHARGE FROM 708 | 0 | 0 | 1 | 0 |
| 3 | DISCHARGE TO 708 | 0 | 0 | 0 | 1 |
| 4 | CHARGE FROM 706 | 1 | 0 | 0 | 0 |
| 5 | DISCHARGE TO 706 | 0 | 1 | 0 | 0 |
| 6 | CHARGE FROM 706 AND CHARGE FROM 708 | 1 | 0 | 1 | 0 |
| 7 | DISCHARGE TO 706 AND DISCHARGE TO 708 | 0 | 1 | 0 | 1 |
| 8 | DISCHARGE TO 706 AND CHARGE FROM 708 | 0 | 1 | 1 | 0 |
| 9 | CHARGE FROM 706 AND DISCHARGE TO 708 | 1 | 0 | 0 | 1 |

EFFICIENT HIERARCHICAL DISTRIBUTED POWER STORAGE

CROSS-REFERENCE TO RELATED APPLICATIONS

This application claims priority and benefit as a National Stage Application under 35 U.S.C. 371 to International Patent Application serial no. PCT/US20/57777, filed on Oct. 28, 2020, titled EFFICIENT HIERARCHICAL DISTRIBUTED POWER STORAGE, which is a continuation in part of U.S. Non-provisional patent application Ser. No. 16/665,497, filed Oct. 28, 2019, each of which is incorporated by reference herein in its entirety.

BACKGROUND

Systems now exist to store power from solar, wind and other electrical sources. In existing alternating current (AC) electricity distribution systems, any energy storage is charged and discharged at the same AC voltage. There are many applications where the stored electricity will be used or supplied at a different AC voltage than the AC voltage connected to the storage system. For example, power may be taken from the utility distribution voltage during off-peak hours and stored for use at mains voltage in a home or business during peak hours. Another example is energy stored from a mains voltage source, such as home solar, and used at utility distribution voltage to supply other utility customers.

For AC electricity to be used at another voltage than the voltage at which it is released from storage or generated, it must pass through a transformer to convert between the voltages. Between 2% and 10% of electricity passing through the transformer is lost as heat in the transformer. An AC power distribution system utilizing conventional storage methods incurs losses as storage is charged and discharged, in addition to losses through the transformer. There is a need for an energy storage solution that reduces loss while maintaining the ability to charge from and discharge power to transmission lines that operate at differing voltage levels.

BRIEF SUMMARY

A system in accordance with one embodiment includes a transformer in an alternating current (AC) power distribution grid, the AC power distribution grid comprising a first side and a second side, and an energy storage device in parallel with the transformer. The energy storage device comprises at least one first power port coupled to a first winding of the transformer and coupled to the first side of the AC power distribution grid, and at least one second power port coupled to a second winding of the transformer; and coupled to a second side of the AC power distribution grid. One side of the distribution grid is connected to one port, and the other side of the distribution grid is connected to other port.

An energy storage device in accordance with one embodiment includes two or more banks of charge storage units arranged to supply a high-voltage terminal, and two or more low-voltage terminals. The high-voltage terminal connects to a first winding of a transformer. One or more of the low-voltage terminals include a second connection to a second winding of the transformer. The energy storage device is configured to allow simultaneous operation of the high-voltage terminal and the one or more low-voltage terminals.

A method in accordance with one embodiment includes operating an energy storage device in parallel with a transformer in a power distribution grid, the power distribution grid comprising a high-voltage side and a low-voltage side. The energy storage device includes at least one high-voltage power port coupled to one of the high-voltage windings of the transformer. At least one low-voltage power port coupled to one of the low-voltage windings of the transformer.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
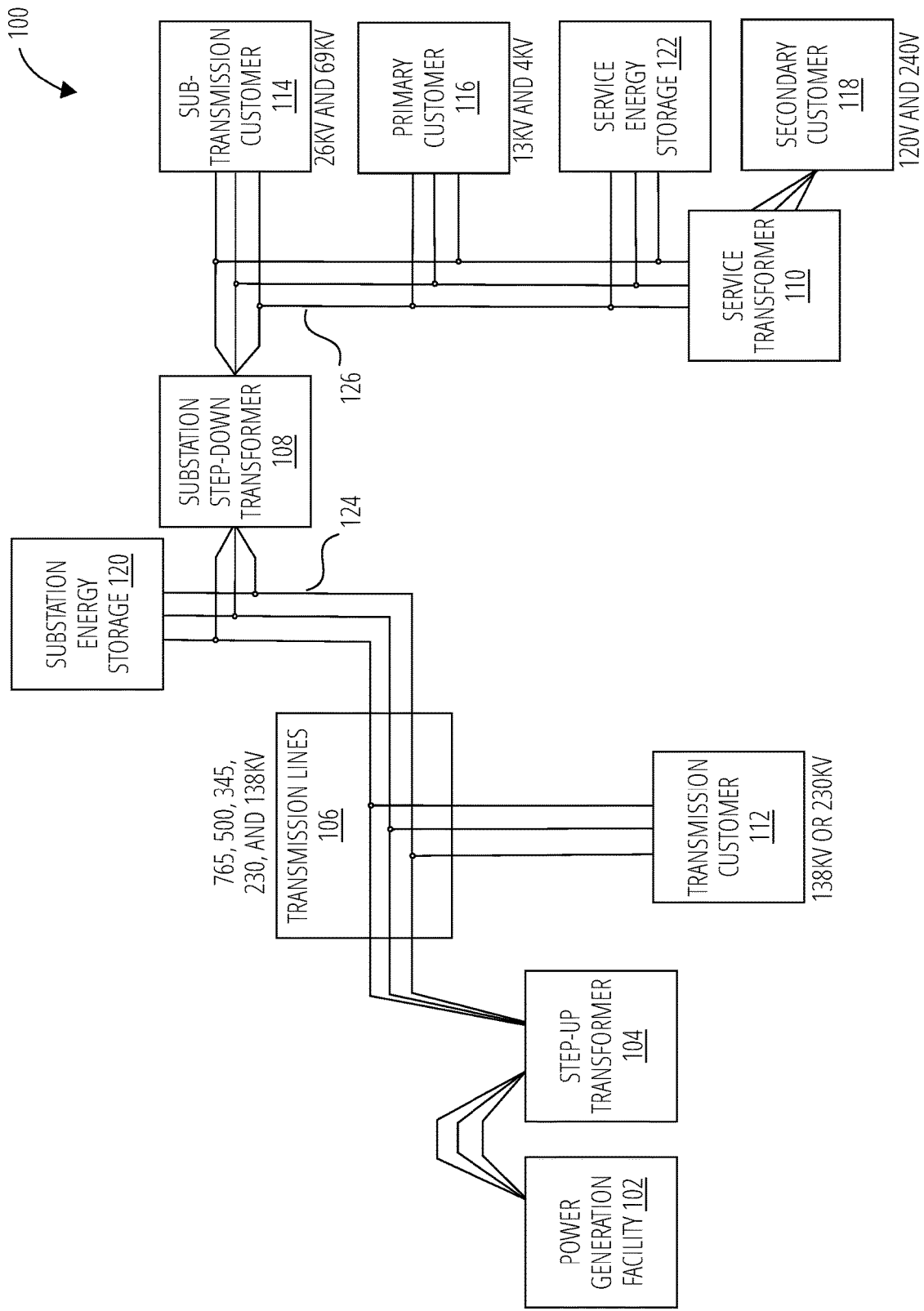
FIG. 1 illustrates a conventional storage deployment in a power distribution grid 100 in accordance with one embodiment.
Figure 2:
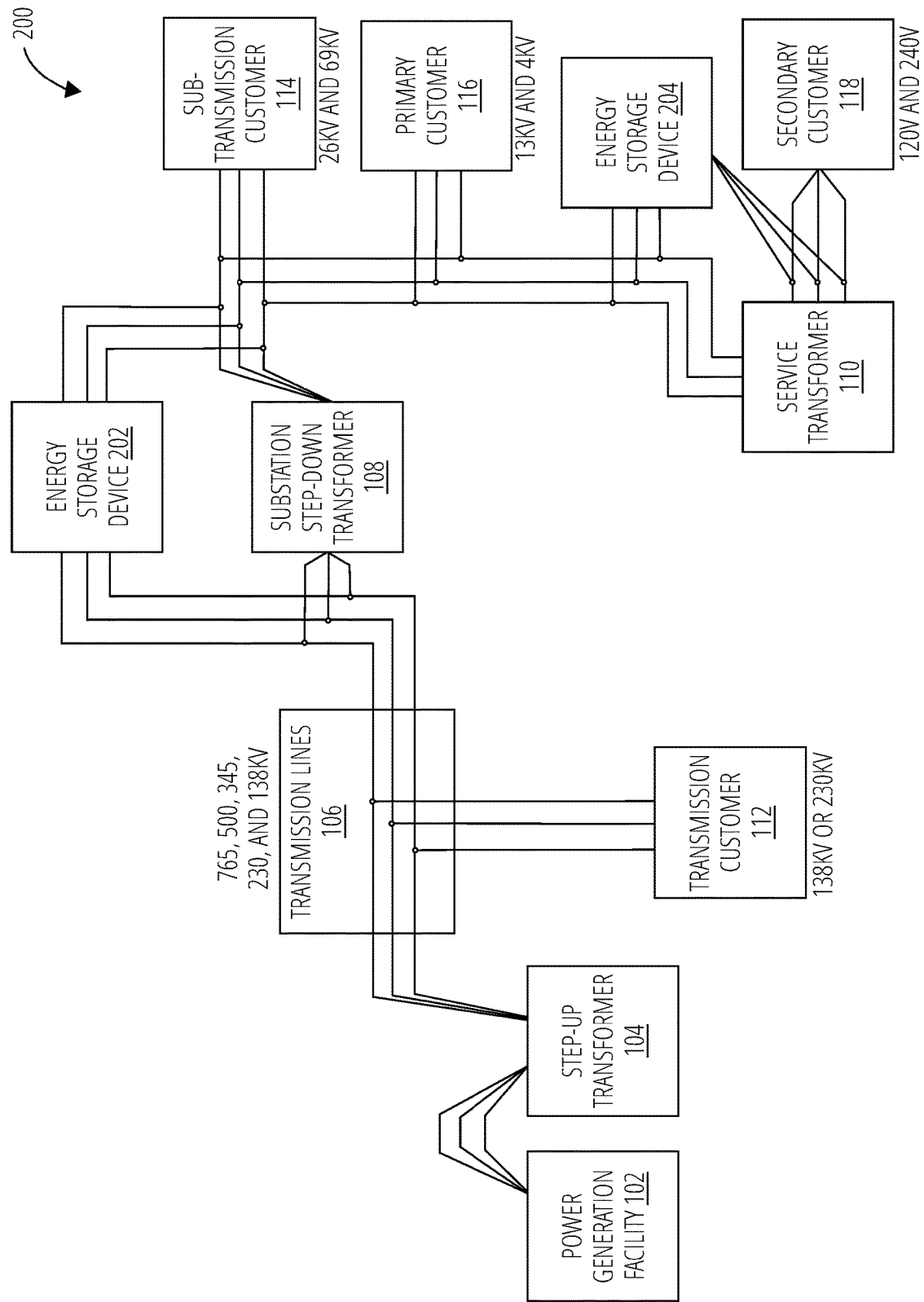
FIG. 2 illustrates a novel storage deployment in a power distribution grid 200 in accordance with one embodiment.

FIG. 1 depicts an example of conventional storage deployment in a power distribution grid 100 in a utility grid. A novel storage deployment in a power distribution grid 200 at conversion points between a higher voltage branch of the power grid and a lower voltage sub-branch of the grid is depicted in FIG. 2. A number of benefits are realized in the novel storage deployment in a power distribution grid 200, as described in more detail below.

Embodiments disclosed herein utilize energy storage devices that are connected to the terminals of more than one winding of a transformer within an AC power distribution grid. "Energy storage device" refers to a device utilizing energy storage units, energy conversion devices, with logic and switches to selectively control charging and discharging of the energy storage units. Herein "energy storage unit" refers to devices that store energy for later controlled release. Such devices include batteries, non-battery chemical storage, capacitors, pumped hydro power, and flywheels. Herein, "energy conversion devices" refer to devices that convert the AC power from the electrical distribution grid to a form of energy compatible with the energy storage units or convert power from energy storage units into AC power compatible with the electrical distribution grid. Such devices include motors to convert AC electrical power to mechanical potential energy in a flywheel or pumped storage hydropower, generators to convert mechanical potential energy in a flywheel or pumped storage hydropower to AC electrical power, AC to DC converters to convert AC electrical power to DC electrical power for storage in batteries, capacitors, or chemical storage, and DC to AC converters to convert DC electrical power stored in batteries, capacitors, or non-battery chemical storage into AC electrical power. In one application electrical distribution grid energy storage devices are located across various voltage transition points throughout the network, as depicted in FIG. 2.

AC electricity is passed through transformers to convert between voltage levels. Between 2% and 10% of electricity passing through a transformer may be lost as waste heat. By charging the disclosed storage system from the terminals of the winding of the transformer where energy is available and delivering that stored energy to the terminals of the winding of the transformer where it will be used, the disclosed system bypasses the transformer. This improves the round trip efficiency of the energy storage system by an amount proportional to the transformer inefficiency.

An energy storage device may be designed to store and release energy at the terminals of any winding of a transformer. With this capability, the round trip efficiency advantages may be achieved when storing and releasing energy to the terminals of one or more windings of the transformer. In such configurations the system may be deployed to similar effect as conventional energy storage solutions.

An energy storage device connected to more than one winding of a transformer may also monitor power conditions at each of the connected windings of the transformer and apply stored energy to improve the conditioning of the electrical power through the transformer.

Figures 7A, 7B:
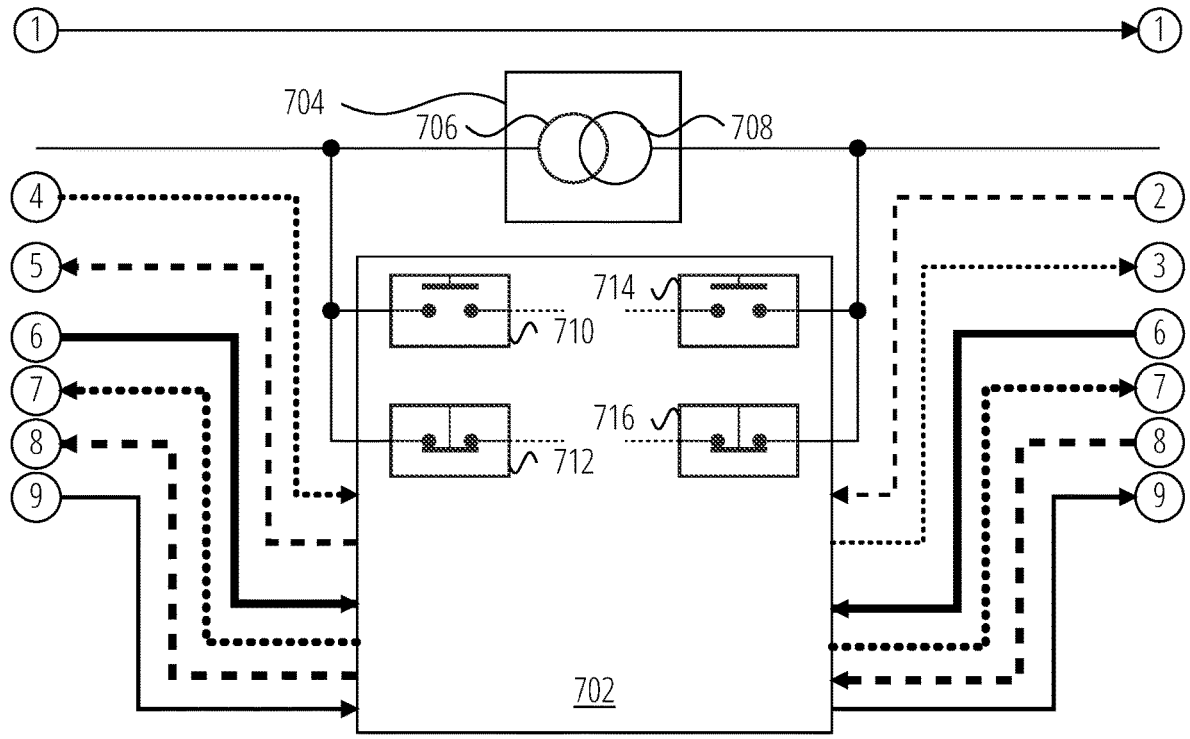
FIG. 7A illustrates an aspect of the subject matter in accordance with one embodiment.
FIG. 7B illustrates an aspect of the subject matter in accordance with one embodiment.

FIG. 7A and FIG. 7B depict a sequence of operation in nine different storage states and illustrate switching positions for each state. When operating in a steady state as shown by sequence 1, power generated or transmitted at a high voltage may pass through a transformer to supply power at a lower voltage level. The energy storage device may charge from the lower voltage lines for storage, as depicted in sequence 2. The energy storage device may release energy to the lower voltage lines for transmission as shown in sequence 3. The energy storage device may charge from the high voltage lines as depicted in sequence 4 and/or release energy to the high voltage lines for transmission as depicted in sequence 5. The energy storage device may also charge from both sides of the transformer, as depicted in sequence 6, and may discharge to one or both sides, as depicted in sequence 7. The charge and discharge may occur simultaneously as depicted in sequence 8 and 9. The energy storage device may be designed with the flexibility to perform under each of these use cases, as needed.

For example, the energy storage device may be connected to both the distribution feed and the service line of a service transformer. The energy storage device may charge from either the distribution feed or the service line, or both. This energy storage device may in turn discharge energy to either the distribution feed, or the service line, or both.

An energy storage device operating in the above conditions may be able to simultaneously sense the voltage and/or current of all attached transformer windings. The device may use stored energy to condition power on the grid lines based on a detected condition of any individual connected winding or a combination of connected windings. For example, the device may apply stored energy to reduce total harmonic distortion, increase power factor, or perform other signal or power conditioning to improve the efficiency of the transformer. A small amount of energy released from storage at strategic times may improve overall system efficiency such that losses and distortions are substantially offset.

The energy storage device may communicate with other grid components at other locations on the grid and apply information about the grid state received from these other components to address grid-wide issues by releasing energy to the grid, or consuming energy from the grid. For example, grid-wide brown out (low system voltage) or impending brown out may be sensed at other locations on the grid, and stored energy may be released by one or more energy storage devices to mitigate the brown out. Alternately, grid-wide over-voltage may be sensed, and storage (consumption) of power may be initiated or increased to mitigate the over-voltage condition. Various energy storage devices throughout the grid may coordinate with one another to mitigate such conditions.

The energy storage device may monitor line conditions of one or more connected windings of a transformer by measuring the voltage across the terminals of a transformer winding or the current through a transformer winding. Herein "monitor a transformer winding" refers to measuring the voltage across the terminals of the transformer winding and/or measuring the current through the transformer winding. The energy storage device may monitor the attached transformer windings to develop a model of transformer state and efficiency. It may then use the developed model to improve the performance of the transformer.

An energy storage device may analyze transformer operation and communicate with grid management systems. It may provide time-shifted energy release or consumption at a higher efficiency than conventional grid-attached storage. It may for example store energy when the cost of energy is low (e.g., during times of low grid energy utilization) and apply this energy later to improve the efficiency of the grid or transformer, when energy costs are higher.

The disclosed devices and systems may reduce wasted energy. In a preferred embodiment, the energy storage device actively monitors the connected transformer windings and compensates when required by releasing energy or drawing energy to maintain voltage and signal integrity, to urge conditions toward a lower difference from an ideal transformer operating voltage, and minimize or eliminate current passing through the transformer.

This may involve prediction of anticipated voltage and/or current demands (either directly from the energy storage device or using another grid component) to proactively release energy to, or draw energy from, a connected winding of the transformer to optimize for the desired condition (e.g., balance between power draw through transformer vs. power factor correction/local storage reserves/network reserves/local or network efficiency). Power conditioning is depicted for example in FIG. 15.

The energy storage device may also or alternatively monitor a winding of the transformer and actively compensate by releasing energy or drawing energy on different winding of the transformer, within desired ranges, to urge the state toward improved transformer efficiency. The drain on stored energy may be limited to a certain threshold to ensure sufficient reserves (e.g., for time shifting and brown/black out/power conditioning).

The energy storage device may also or alternatively monitor a first transformer winding and monitor a second transformer winding of the same transformer and actively compensate by injecting energy into the first transformer winding and/or drawing energy from the second transformer winding. This may be done to condition the power supplied to a nearby transformer on the terminals of one or both windings of that transformer.

Using the system disclosed herein, loss may be reduced through each transformer traversal, as depicted in FIG. 14. Multiple customers may be served by a single storage solution. The system may provide a statistical multiplexing effect. This may allow for less total energy storage requirements than the aggregate of peak storage required by individual customers and their associated traversal losses.

Stored energy may be supplied from the grid or supplied from end customers. This may reduce the need for distribution-level grid upgrades. Reduced need for upgrades may enable deferral or elimination of upgrades at both local and trunk level and may facilitate adaptation of existing infrastructure for an increasing portion of renewable and inconsistent power generation (e.g., solar, wind generation). The disclosed system may add a buffer to improve real-time management of grid loads and may provide load balancing for nearby branches and sub-branches of the grid, upstream, downstream, and adjacent to each energy storage device.

The system disclosed is not dependent on energy storage unit medium. It may provide conditioning for generation points downstream from the main grid, which may mitigate phase alignment and power factor issues, and may enable utilities to points of access to the main grid. Decentralization of energy storage using the disclosed system may increase the fault tolerance of the overall grid.

The disclosed system may reduce transmission loss. Power may travel a shorter distance over the electrical grid. Locally generated power may be consumed locally, even when generation and consumption are time-shifted. Conversion losses may be reduced, as power injection may occur on the same sub-branch as where use takes place. The conversion steps up and down may also be reduced. Grouped units of the disclosed energy storage device may cooperate to adjust power phase and quality to clean up "dirty" power conditions on the consumer side of the distribution grid. Integration and communication with other grid components such as sensors and operation centers may assist in the coordinated storage and release of energy. In one embodiment, short periods of high power draw may be buffered, improving transmission efficiency.

An energy storage device may monitor the windings of a transformer over time learn the characteristics of that transformer. Examples include temperature characteristics and time constants of the transformer transfer function. The storage device may not need to be physically located on or near the transformer. It may, for example, be mounted on a different pole than the transformer, provided it is coupled to both the high and low voltage terminals of the transformer. The energy storage device may manage power line communication (PLC) across a transformer. It may for example be configured to terminate, repeat, or pass through PLC waveforms across the transformer.

The following description utilizes three phase grids and grid devices by way of example. The invention and techniques are generally applicable to two phase and four phase grids and devices as well as higher phase technologies.

FIG. 1 depicts a conventional storage deployment in a power distribution grid 100 in accordance with one embodiment. Components of the conventional deployment include a power generation facility 102, a step-up transformer 104, transmission lines 106 comprising main grid lines 124, a substation step-down transformer 108 between the main grid lines 124 and the consumer grid lines 126, a service transformer 110, a transmission customer 112, a sub-transmission customer 114, a primary customer 116, a secondary customer 118, substation energy storage 120, and service energy storage 122.

Power may be generated at the power generation facility 102 through combustion of fossil fuels, hydroelectric power conversion, wind or solar farms, and other techniques known in the art. This power may be passed through a step-up transformer 104 to high voltages for transmission across long distances via the transmission lines 106. The transmission lines 106 may carry power at levels in the hundreds of kilovolts. A transmission customer 112 may use 138 kV or 230 kV power, for example, and may draw power directly from the transmission lines 106.

At a power substation, the transmission lines 106 may run to a substation step-down transformer 108 to convert the received power to lower voltage levels. The substation may include substation energy storage 120, which is conventionally deployed at the end of a T-junction, as shown in FIG. 1. The substation step-down transformer 108 reduces voltage levels to the 4 kV to 69 kV range, for example, for consumption by a typical sub-transmission customer 114 or primary customer 116.

Power lines from the substation step-down transformer 108 may also run to a storage service transformer 110 in order to step down the voltage levels even further, for example to the 120V and 240V ranges typically consumed by a secondary customer 118 such as a residence or business. Service energy storage 122 may be deployed on the higher-voltage side of a service transformer 110, again on a T-junction as shown.

FIG. 2 illustrates a novel storage deployment in a power distribution grid 200 in accordance with one embodiment. The novel deployment is depicted for an energy storage device 202 and an energy storage device 204. Other arrangements and numbers of energy storage devices in accordance with the invention are of course possible.

The primary components of the utility grid are the same as depicted in FIG. 1. However the energy storage device 202 and energy storage device 204 are connected to the high voltage and low voltage windings of the substation step-down transformer 108 and service transformer 110, respectively.

Figure 3:
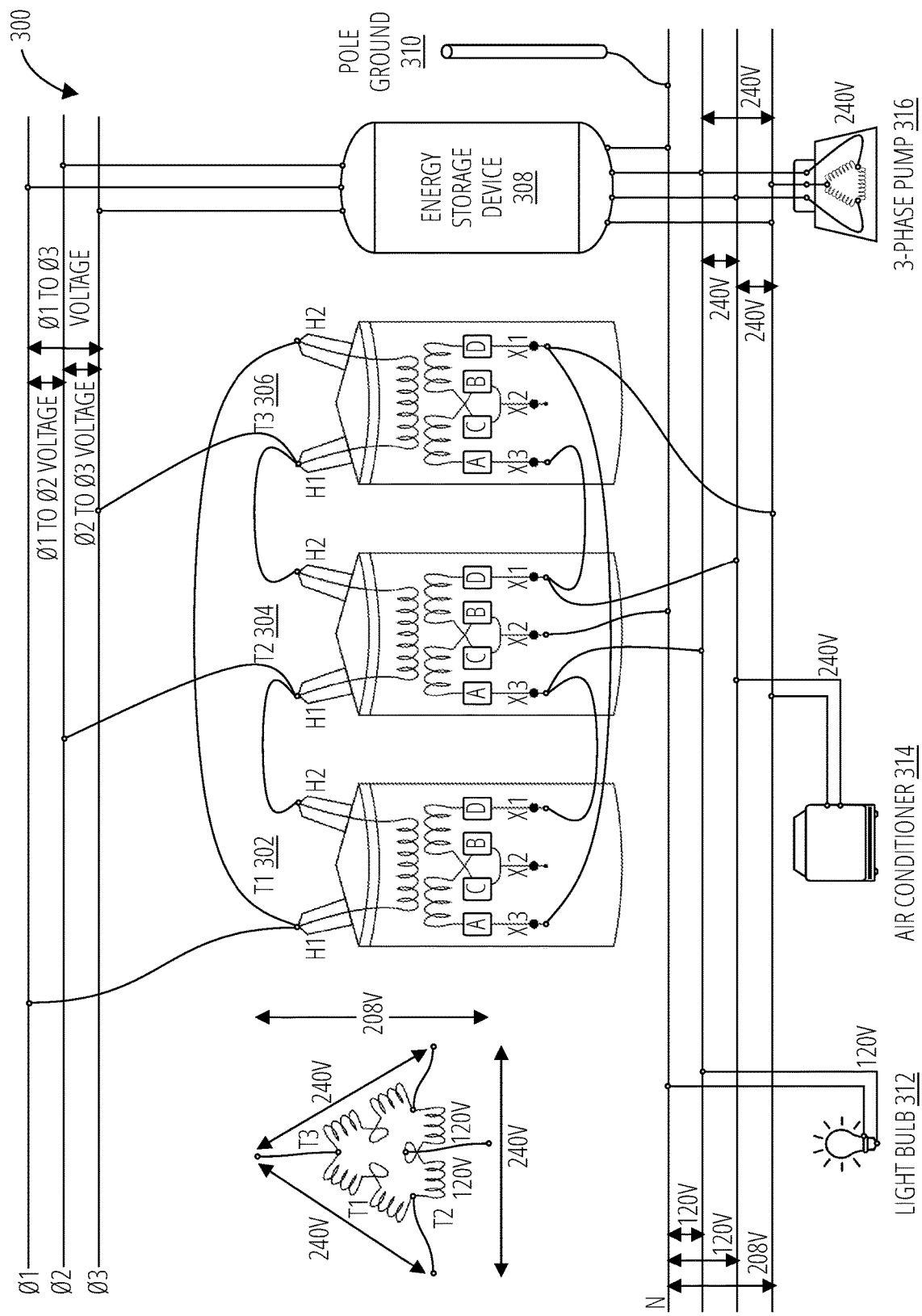
FIG. 3 illustrates a transformer delta configuration 300 in accordance with one embodiment.

FIG. 3 depicts a transformer delta configuration 300 in accordance with one embodiment. The depiction shows a first transformer 302 (T1), a second transformer 304 (T2), a third transformer 306 (T3), a parallel-installed energy storage device 308, a pole ground 310, a light bulb 312, an air conditioner 314, and a three-phase pump 316. The transformer delta configuration 300 is provided as an example but other configurations are also supported, such as delta-wye transformer configurations.

These components are depicted in a configuration such that power on high voltage lines is stepped down to 120V, 208V, and 240V levels by arranging the three transformers in a delta configuration. The 120V line may be used to power typical small appliances such as the light bulb 312 in an indoor lamp. The 240V line may be used to power the air conditioner 314 or the three-phase pump 316.

Figure 4:
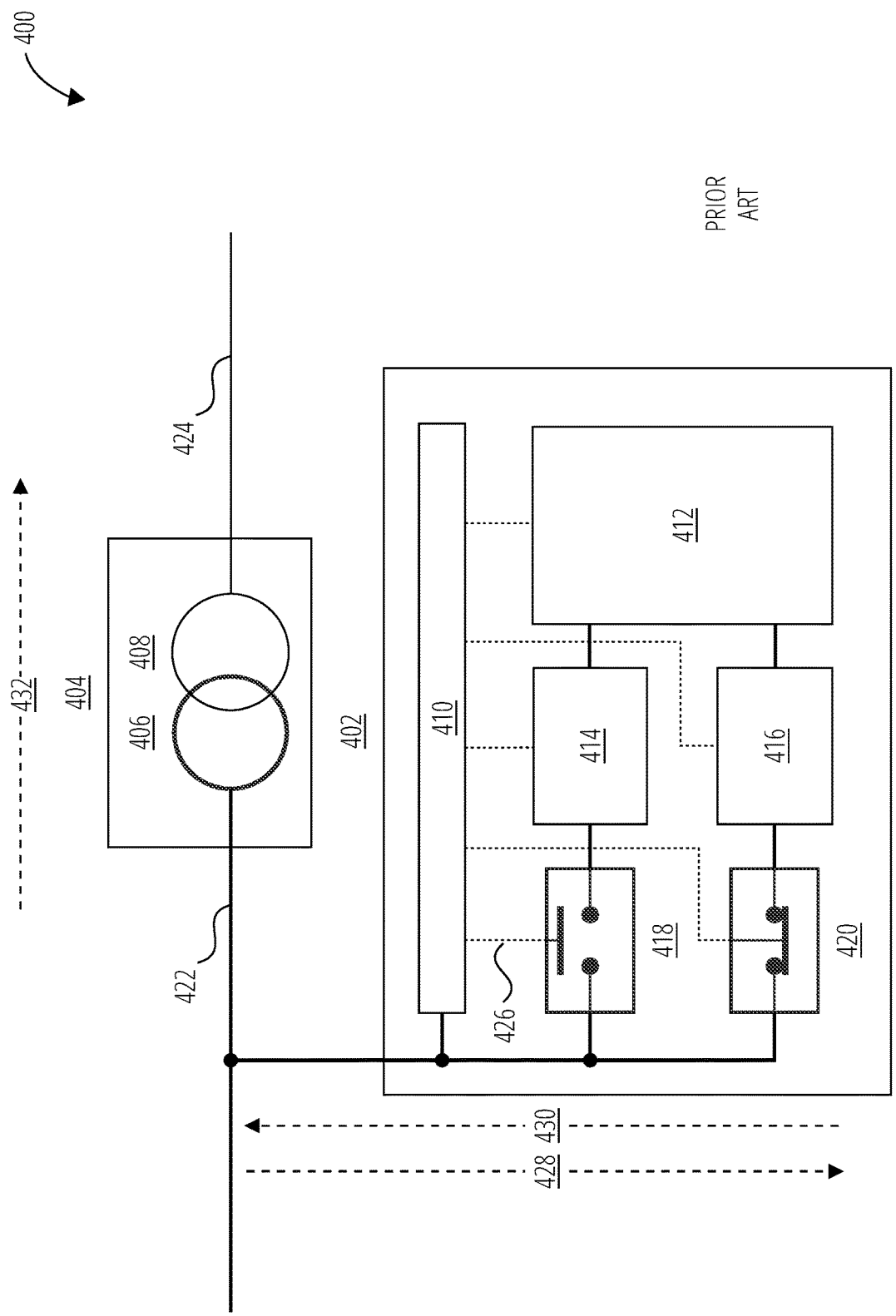
FIG. 4 illustrates an aspect of the subject matter in accordance with one embodiment.

FIG. 4 depicts a conventional system with energy storage 400, which may be configured as the substation step-down transformer 108 and substation energy storage 120 or service transformer 110 and service energy storage 122 introduced in FIG. 1. The conventional system with energy storage 400 may comprise an energy storage device 402 connected as illustrated to a step-down transformer 404.

The energy storage device 402 may comprise charge/discharge logic 410, an energy storage unit 412, a converter from AC power to energy storage unit power 414, a converter from energy storage unit power to AC power 416, a switch 418, and a switch 420. The step-down transformer 404 may comprise a primary winding 406 and a secondary winding 408. The primary winding 406 may connect to a high voltage side 422 of a power distribution grid, and the secondary winding 408 may connect to a low voltage side 424 of that grid.

In a conventional deployment, the energy storage device 402 may be connected only to the primary winding 406 of the step-down transformer 404. The charge/discharge logic 410 of the energy storage device 402 may use control signals 426 to configure the energy storage device 402 to either charge from the high voltage side 422 of the step-down transformer 404, by closing switch 418 and opening switch 420. This causes the AC power on the high voltage side 422 to reach the converter from AC power to energy storage unit power 414, so that the energy from the power distribution grid may be converted into a form that may be stored in the energy storage unit 412.

The charge/discharge logic 410 of the energy storage device 402 may at another time configure switch 420 to close while switch 418 is open. This directs the energy from the energy storage unit 412 through the converter from energy storage unit power to AC power 416, generating AC power that may then be released through switch 420 to the high voltage side 422 and the primary winding 406 of the step-down transformer 404. Thus in the absence of energy on the high voltage side 422 of the power distribution grid, the energy storage device 402 may provide stored energy to continue powering the primary winding 406, which in turn charges the secondary winding 408, providing power downstream.

Energy conversion efficiency is not perfect. In a conventional system with energy storage 400 as depicted, three types of power loss may be incurred, as indicated by the dashed arrows. Charging loss 428 may be incurred as power loss along wiring and the internal stages of the energy storage device 402 as the energy storage unit 412 is charged from the high voltage side 422 of the power distribution grid. Discharging loss 430 may be incurred as similar power loss along the stages of the energy storage device 402 as the energy storage unit 412 discharges stored power back to the high voltage side 422 of the power distribution grid. Similarly, there is some loss across transformer 432 as high voltage side 422 power is stepped down from the primary winding 406 to the secondary winding 408 and transmitted to the low voltage side 424 of the power distribution grid. Thus, when using stored power to charge the low voltage side 424 of the power grid in a conventional system with energy storage 400, the total power lost may be expressed as:

$$\text{Loss}_{total} = \text{Loss}_{Charge} + \text{Loss}_{Discharge} + \text{Loss}_{Transformer} \quad \text{(Eq. 1)}$$

Figure 5:
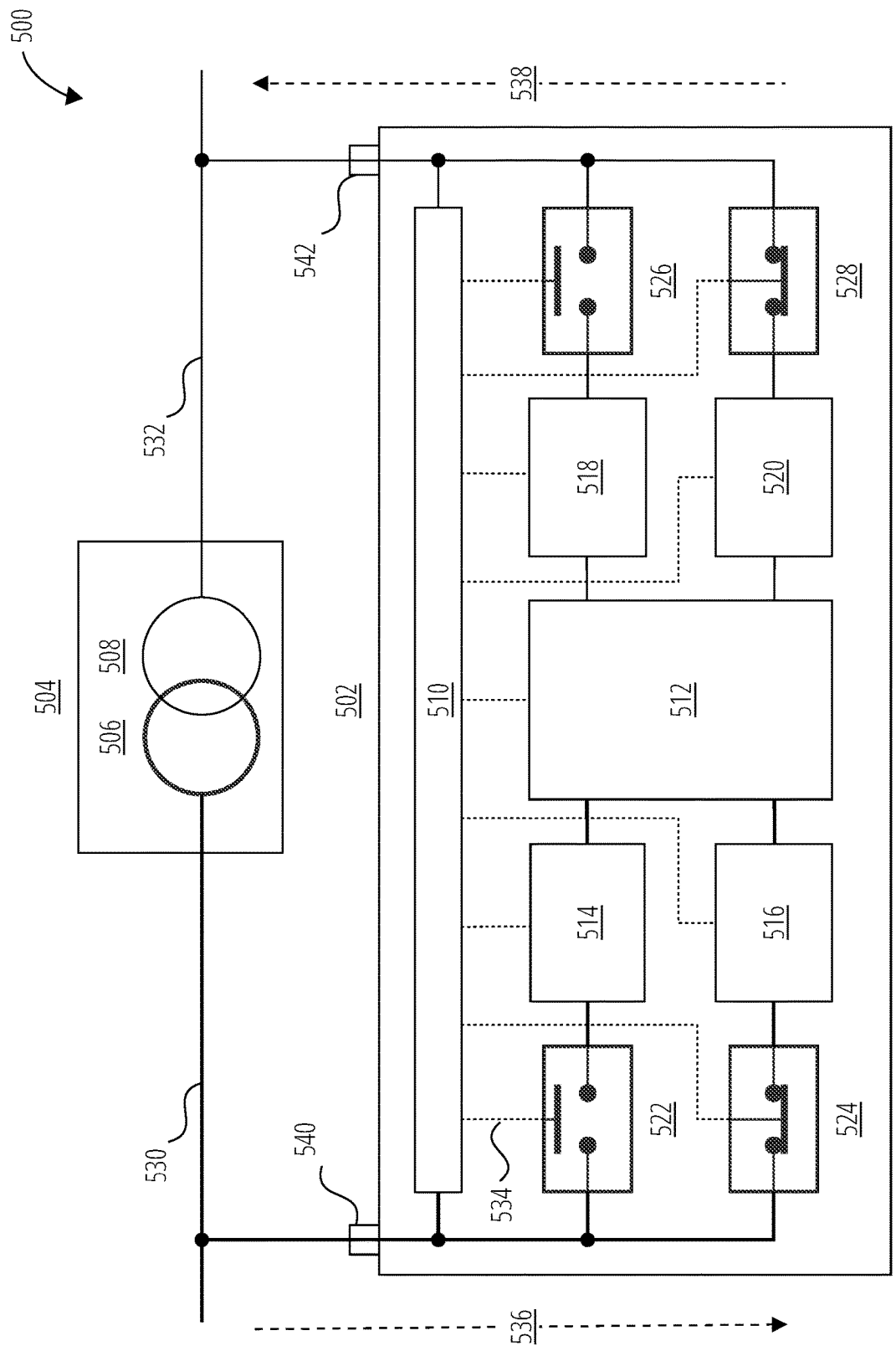
FIG. 5 illustrates an aspect of the subject matter in accordance with one embodiment.

FIG. 5 illustrates a novel system with energy storage 500 in accordance with one embodiment. Such a system may be configured in place of the energy storage device 202 and substation step-down transformer 108 or the energy storage device 204 and service transformer 110 illustrated in FIG. 2.

The step-down transformer 504 may have a primary winding 506 connected to the high voltage side 530 of a power distribution grid and a secondary winding 508 connected to the low voltage side 532 of a power distribution grid. The energy storage device 502 may have charge/discharge logic 510, an energy storage unit 512, an energy storage unit 512, a converter from AC power to energy storage unit power 514, a converter from energy storage unit power to AC power 516, a converter from AC power to energy storage unit power 518, a converter from energy storage unit power to AC power 520, a switch 522, a switch 524, a switch 526, a switch 528, a first power port 540, and a second power port 542.

The charge/discharge logic 510 may sense the state of the energy storage unit 512 and the converter from AC power to energy storage unit power 514, converter from energy storage unit power to AC power 516, converter from AC power to energy storage unit power 518, and converter from energy storage unit power to AC power 520, and may measure the voltage and/or current through the primary winding 506 and the secondary winding 508, as directed through the first power port 540 and second power port 542, respectively. The charge/discharge logic 510 may operate all of the other components of the energy storage device 502 through control signals 534 to each component. In this manner, the energy storage device 502 may draw energy from the high voltage side 530 to the energy storage unit 512 by opening switch 522 while switch 524 is closed such that the AC power on high voltage side 530 may flow to the energy storage unit 512, and be passed from there to storage in the energy storage unit 512. The energy storage device 502 may also direct the switch 524 to open while switch 522 is closed, thereby sending stored energy from energy storage unit 512 through the converter from energy storage unit power to AC power 516 and switch 524 in order to discharge energy to the high voltage side 530. In this respect, the energy storage device 502 provides functionality available in the energy storage device 402 of the conventional system with energy storage 400.

In addition, however, the charge/discharge logic 510 of the energy storage device 502 may further operate switch 526 to open while switch 528 is closed, directing energy from the low voltage side 532 to the converter from AC power to energy storage unit power 518 so that it may be stored in the energy storage unit 512, and likewise open switch 528 while switch 526 is closed to send energy from the energy storage unit 512 through the converter from energy storage unit power to AC power 520 and out to the low voltage side 532. This capability is not present in conventional power storage configurations.

In addition to providing improved flexibility in directly charging from and discharging to the low voltage side 532 as well as the high voltage side 530, this solution offers improved efficiency, as may be seen in comparing FIG. 5 with FIG. 4. In this novel configuration, charging loss 536 and discharging loss 538 may still be incurred during a common operation of charging from the high voltage side 530 and discharging to the low voltage side 532. However, this novel solution, in discharging directly to the low voltage side 532, and not to the high voltage side 530 and through the step-down transformer 504, this present solution may eliminate the loss across transformer 432 introduced in FIG. 4. Thus, for this novel solution, the total power lost may be expressed as:

$$\text{Loss}_{total} = \text{Loss}_{Charge} + \text{Loss}_{Discharge} \quad \text{(Eq. 2)}$$

This represents an improvement over conventional power storage solutions.

In one embodiment, the energy storage device 502 may be a multi-phase device with a separate power port for each winding. Thus the first power port 540 shown may comprise three physical connections each independently connected to internal components of the energy storage device 502. The single connections shown for the first power port 540 and second power port 542 in FIG. 5 are for simplicity of illustration, and not intended to be limiting.

Figure 6:
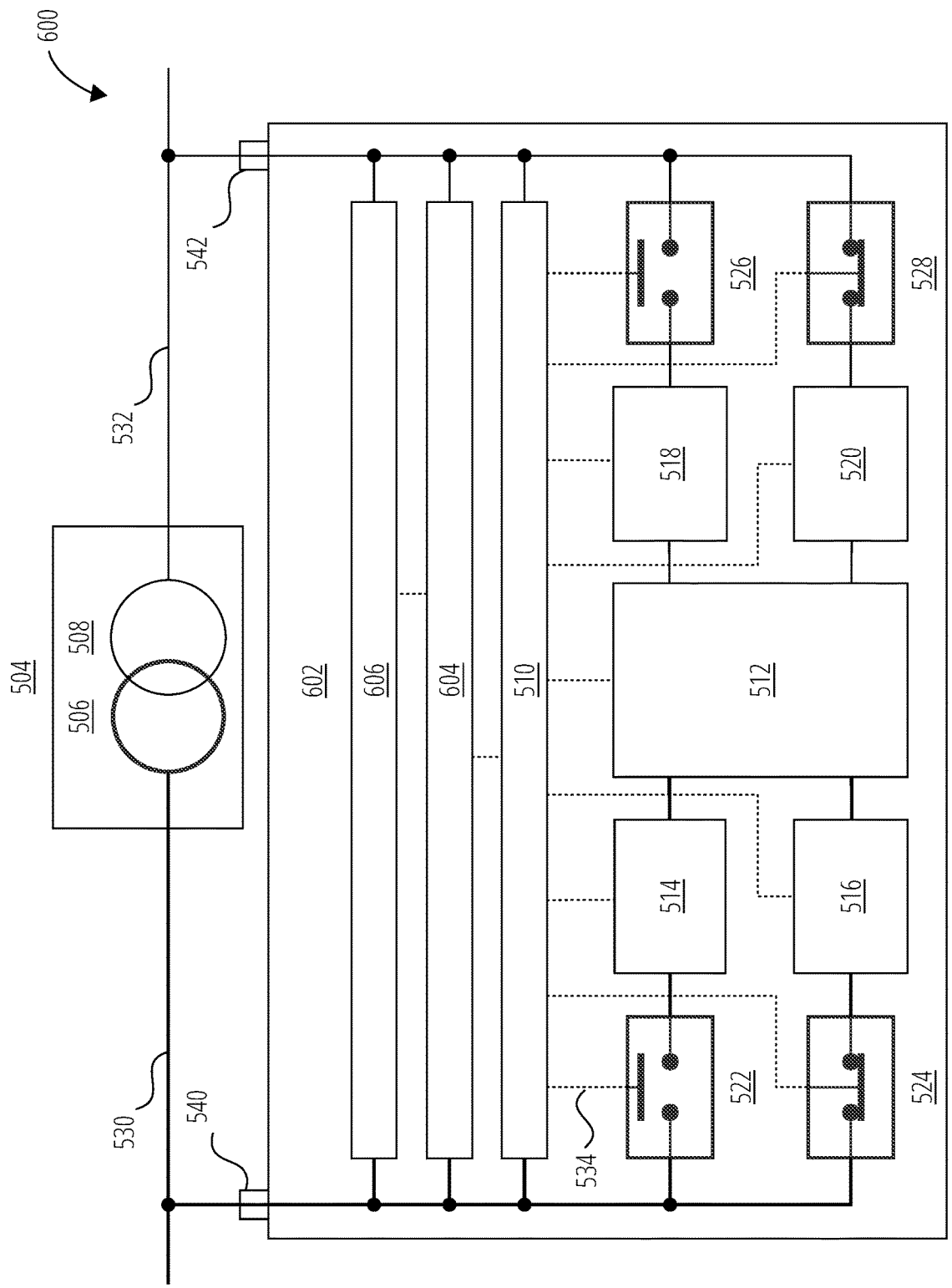
FIG. 6 illustrates an aspect of the subject matter in accordance with one embodiment.

FIG. 6 illustrates a novel system with energy storage 600 in accordance with one embodiment. In addition to all of the components introduced in FIG. 5, the energy storage device 602 of the novel system with energy storage 600 further comprises signal conditioning logic 604 and a transformer winding monitor 606. The signal conditioning logic 604 and transformer winding monitor 606 may sense the voltage and current of the high voltage side 530 of the transformer and the low voltage side 532 of the transformer. The signal conditioning logic 604 and transformer winding monitor 606 may communicate with the charge/discharge logic 510 via control signals 534. The signal conditioning logic 604 and transformer winding monitor 606 may provide information for use in implementing power conditioning 1200, discussed in further detail with regard to FIG. 12.

FIG. 7A illustrates a novel energy storage device 702 such as that illustrated in FIG. 5, configured by a number of switches to operate in nine storage operation states. The energy storage device 702 is connected across a step-down transformer 704, and is configured such that one side connects to the high-voltage side of a power distribution grid on the primary winding side 706 of the step-down transformer 704, and the other side connects to the low-voltage side of the power distribution grid on the secondary winding side 708 of the step-down transformer 704. The high and low voltage sides of a power distribution grid may correspond, for example, to the main grid lines 124 and consumer grid lines 126 introduced in FIG. 1 and FIG. 2. The energy storage device 702 comprises the components illustrated in FIG. 5, namely energy storage unit(s), energy conversion devices to convert AC power to power compatible with the energy storage unit(s), and switches to control the flow of power between the transformer windings and the energy storage unit(s). These switches are illustrated as switch 710, switch 712, switch 714, and switch 716.

FIG. 7B illustrates a table listing the nine storage operations, labeled in sequence from 1 to 9, corresponding to the circled numbers indicating the state operation in FIG. 7A. The switching states used to implement each storage operation are also illustrated in the table of FIG. 7B, with the switches numbered as shown in FIG. 7A, and the switch state indicated as "0" for an open switch with no energy flow, and "1" for a closed switch allowing energy flow.

For Sequence 1, or steady state operation, power flows from the primary winding side 706 through the step-down transformer 704 to the secondary winding side 708. Switch 710, switch 712, switch 714, switch 716 are all switched off or open ("0"), meaning the energy storage device 702 is not drawing energy from either side of the step-down transformer 704 (charging), nor releasing energy to either side of the step-down transformer 704 (discharging).

Sequence 2 depicts a draw-from-low or charge from secondary winding side 708 scenario in accordance with one embodiment. Power flows across the step-down transformer 704 from the primary winding side 706 to the secondary winding side 708 during power distribution over a power distribution grid. The energy storage device 702 draws energy for charging the energy storage units from the secondary winding side 708 through switch 714, which is open or on, as indicated by a "1" for that switch in that sequence in the table of FIG. 7B.

In Sequence 2 and subsequent operations described below, power need not be flowing through the step-down transformer 704. For example the transformer may be "blown" and non-functional, or the high-side feeder supplying the transformer may not be receiving power. Thus it should be understood that although the scenarios are described as occurring when power flows through the transformer, this need not be the case. The energy storage device 702 may release energy onto a transmission line with or without power flowing through the transformer, and may charge even if the transformer is "off", blown, or otherwise not transmitting power, so long as there is power on the line from which the energy storage device 702 is drawing energy.

Sequence 3 depicts a release-to-low or discharge to secondary winding side 708 scenario in accordance with one embodiment. Power again flows across the step-down transformer 704 from the primary winding side 706 to the secondary winding side 708 during power distribution over the power distribution grid. However in Sequence 3 the energy storage device 702 releases stored energy from the energy storage units to the secondary winding side 708 through the switch 716, which is open or on, as indicated by a "1" for that switch in that sequence in the table of FIG. 7B.

Sequence 4 depicts a draw-from-high or charge from primary winding side 706 scenario in accordance with one embodiment. As before power flows across the step-down transformer 704 from the primary winding side 706 to the secondary winding side 708 during power distribution over the power distribution grid. However in Sequence 4 the energy storage device 702 draws energy for charging the energy storage units from the primary winding side 706 through the switch 710, which is indicated as open in the table in FIG. 7B.

Sequence 5 depicts a release-to-high or discharge to primary winding side 706 scenario in accordance with one embodiment. As before power flows across the step-down transformer 704 from the primary winding side 706 to the secondary winding side 708 during power distribution over the power distribution grid. However in Sequence 5 the energy storage device 702 release stored energy from the energy storage units to the primary winding side 706 through the switch 712, which is indicated as open in the table in FIG. 7B.

Sequence 6 depicts a draw-from-high-and-low or charge from primary winding side 706 and secondary winding side 708 scenario in accordance with one embodiment. As power flows across the step-down transformer 704 from the primary winding side 706 to the secondary winding side 708 during power distribution on the power distribution grid, the energy storage device 702 draws energy for charging the energy storage units from both the primary winding side 706 and the secondary winding side 708 through switch 710 and switch 714 respectively, indicated as open in the table in FIG. 7B.

Sequence 7 depicts a release-to-high-and-low or discharge to primary winding side 706 and secondary winding side 708 scenario in accordance with one embodiment. As power flows across the step-down transformer 704 from the primary winding side 706 to the secondary winding side 708 during power distribution on the power distribution grid, the energy storage device 702 releases stored energy from the energy storage units to both the primary winding side 706 and the secondary winding side 708 through switch 712 and switch 716 respectively, indicated as open in the table in FIG. 7B.

Sequence 8 depicts a release-to-high/draw-from-low or discharge to primary winding side 706, charge from secondary winding side 708 scenario in accordance with one embodiment. As power flows across the step-down transformer 704 from the primary winding side 706 to the secondary winding side 708 during power distribution on the power distribution grid, the energy storage device 702 releases stored energy from the energy storage units to the primary winding side 706 while drawing energy from the secondary winding side 708 via switch 712 and switch 714 respectively, indicated as open in the table in FIG. 7B.

Sequence 9 depicts a draw-from-high/release-to-low or charge from primary winding side 70, discharge to secondary winding side 708 scenario in accordance with one embodiment. As power flows across the step-down transformer 704 from the primary winding side 706 to the secondary winding side 708 during power distribution on the power distribution grid, the energy storage device 702 draws energy from the primary winding side 706, through an energy conversion device, into the energy storage units and releases energy, from the energy storage units, through an energy conversion device, to the secondary winding side 708 through switch 710 and switch 716 respectively, indicated as open in the table in FIG. 7B.

In each of these scenarios, an energy storage device may be connected to windings of a number of transformers, for example a wye or delta transformer configuration as in a power distribution grid supplying individual homes and businesses. In a case where multiple home or business service lines are attached to a single winding of a service transformer, individual voltage and current sensing of each service line may be used to monitor each line independently. In some installations the energy storage device may be coupled between extra-high-voltage (EHV) transmission lines and distribution feeder lines.

Figure 8:
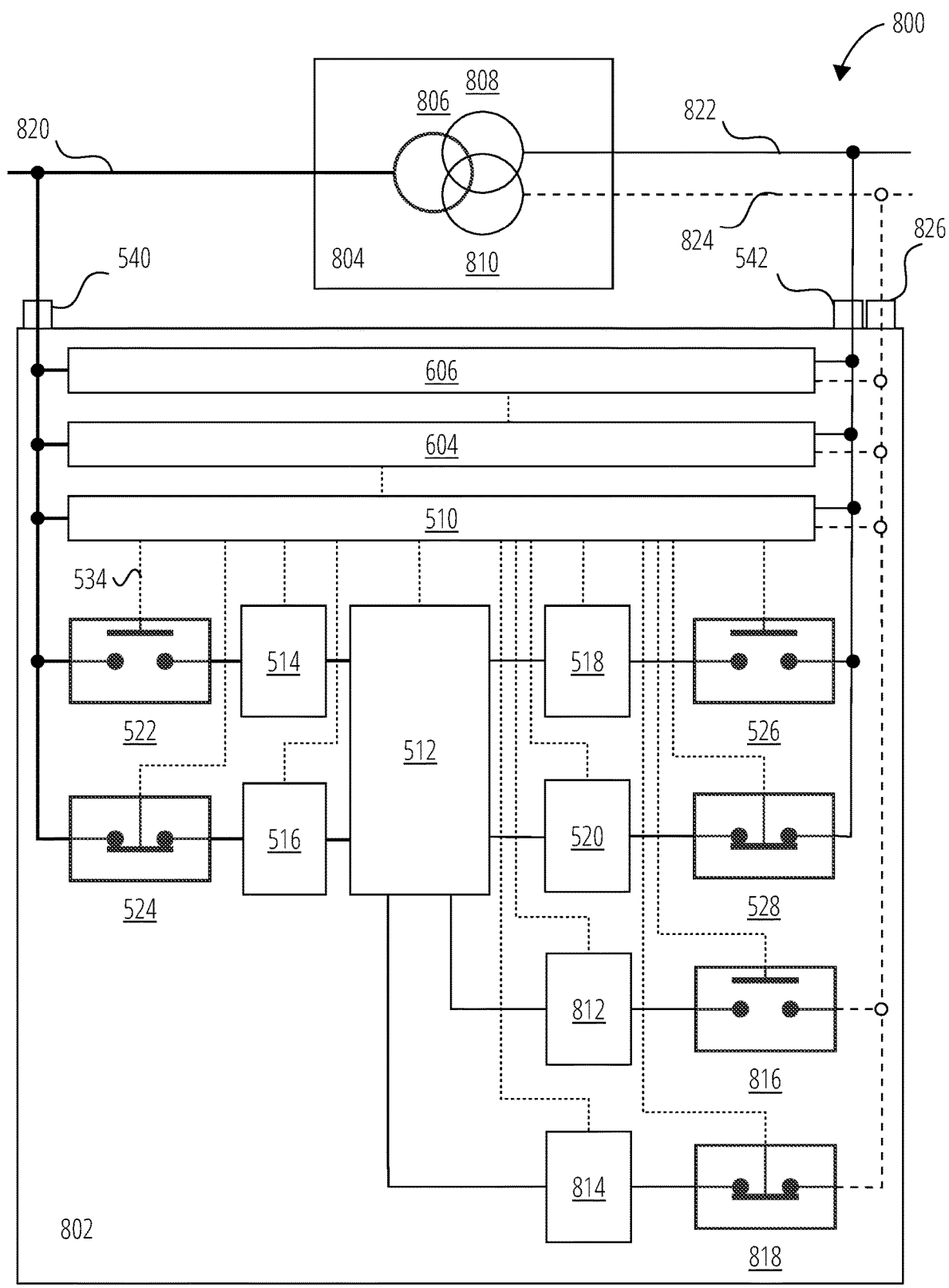
FIG. 8 illustrates an aspect of the subject matter in accordance with one embodiment.

The energy storage device may be connected to multiple windings on both the high voltage and low voltage terminals of the transformer, depending on the number of phases of the transmission lines. FIG. 8 illustrates a novel system with energy storage 800 in one embodiment in which energy storage device 802 connects to each winding of a step-down transformer 804 that steps down from a high voltage side 820 of a power distribution grid connected to its primary winding 806 to both a first low voltage side 822 and a second low voltage side 824 of the power distribution grid, connected to its secondary winding 808 and tertiary winding 810, respectively.

The energy storage device 802 may comprise all of the components introduced in FIG. 5 and FIG. 6, in order to connect to the primary winding 806 and secondary winding 808 as described with regard to the primary winding 506 and secondary winding 508 of those figures. In addition, the energy storage device 802 of this novel system with energy storage 800 may comprise a third power port 826 in order to couple the tertiary winding 810 to the energy storage device 802, as well as a converter from AC power to energy storage unit power 812, a converter from energy storage unit power to AC power 814, a switch 816, and a switch 818 that operate in a similar manner such that the energy storage device 802 may charge the energy storage unit 512 using energy on the second low voltage side 824 through connection with the tertiary winding 810 when switch 816 is open and switch 818 is closed. The charge/discharge logic 510, signal conditioning logic 604, and transformer winding monitor 606, may sense the voltage and current of each connected winding of the transformer (primary winding 806, secondary winding 808, and tertiary winding 810). The step-down transformer 804 may also discharge stored energy to the tertiary winding 810, when switch 818 is open and switch 816 is closed.

Figure 9:
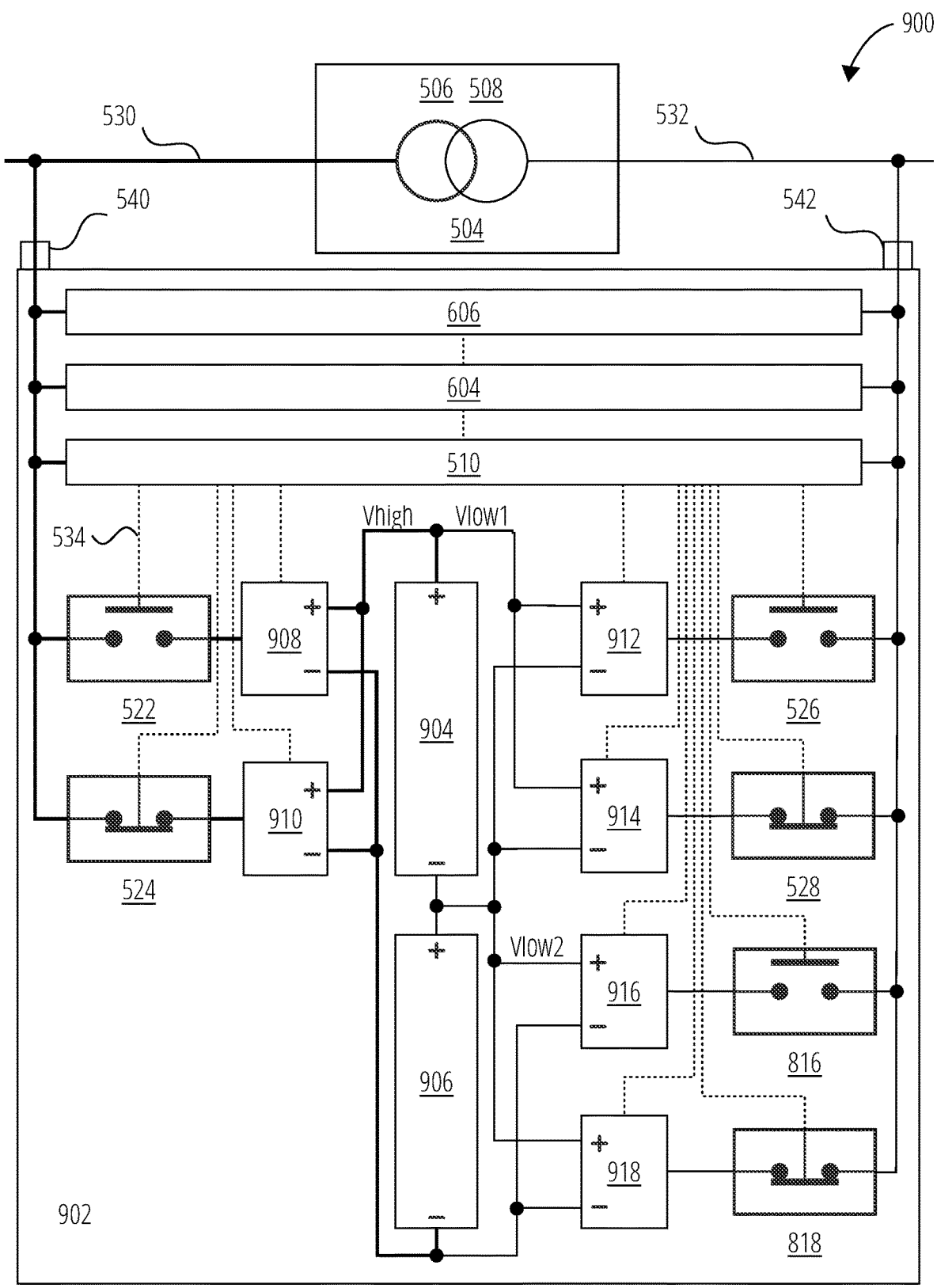
FIG. 9 illustrates an aspect of the subject matter in accordance with one embodiment.

FIG. 9 illustrates a novel system with energy storage 900 in accordance with one embodiment. The energy storage device 902 of the novel system with energy storage 900 comprises energy storage units (i.e., DC charge storage units), the control, conditioning, and monitoring logic as previously discussed, and uses the switches previously described to connect to primary and secondary windings of a step-down transformer in a power distribution grid. However, in the energy storage device 902, the energy storage unit previously described may be replaced with charge storage unit such as batteries, battery banks, or some other charge storage units. These are illustrated as a DC charge storage unit 904 and a DC charge storage unit 906. The configuration of the battery banks may be arranged to supply the energy conversion devices servicing each of the windings of the transformer. The AC to DC converter 908, DC to AC converter 910, AC to DC converter 912, DC to AC converter 914, AC to DC converter 916, and DC to AC converter 918 may be connected as shown to convert the AC power on the high voltage side 530 and low voltage side 532 of the power distribution grid to DC power suitable for storage in the DC charge storage unit 904 and DC charge storage unit 906.

In one embodiment, there may be sufficient battery banks coupled in series and converted to AC power connected to the switch to the primary winding 506 of step-down transformer 504 to bring the DC voltage output Vhigh close or equal to the high voltage side 530, reducing the complexity and improving the efficiency of the energy conversion devices, in this case the DC to AC power and AC to DC power conversion circuitry. Likewise there may be sufficient battery banks coupled in series and converted to AC power connected to the switch to the secondary winding 508 to bring one or both of the output voltages Vlow1 and Vlow2 close to or equal to the low voltage side 532. In the depicted example energy storage device 902, Vlow1 is the voltage across DC charge storage unit 904, connected through AC to DC converter 912/switch 526 and DC to AC converter 914/switch 528 to the secondary winding 508. Vlow2 is the voltage across DC charge storage unit 906, connected through AC to DC converter 916/switch 816 and DC to AC converter 918/switch 818 to the secondary winding 508. Vhigh is the voltage across the series combination of DC charge storage unit 904 and DC charge storage unit 906, connected through AC to DC converter 908/switch 522 and DC to AC converter 910/switch 524 to primary winding 506, and Vhigh=Vlow2+Vlow1.

Figure 10:
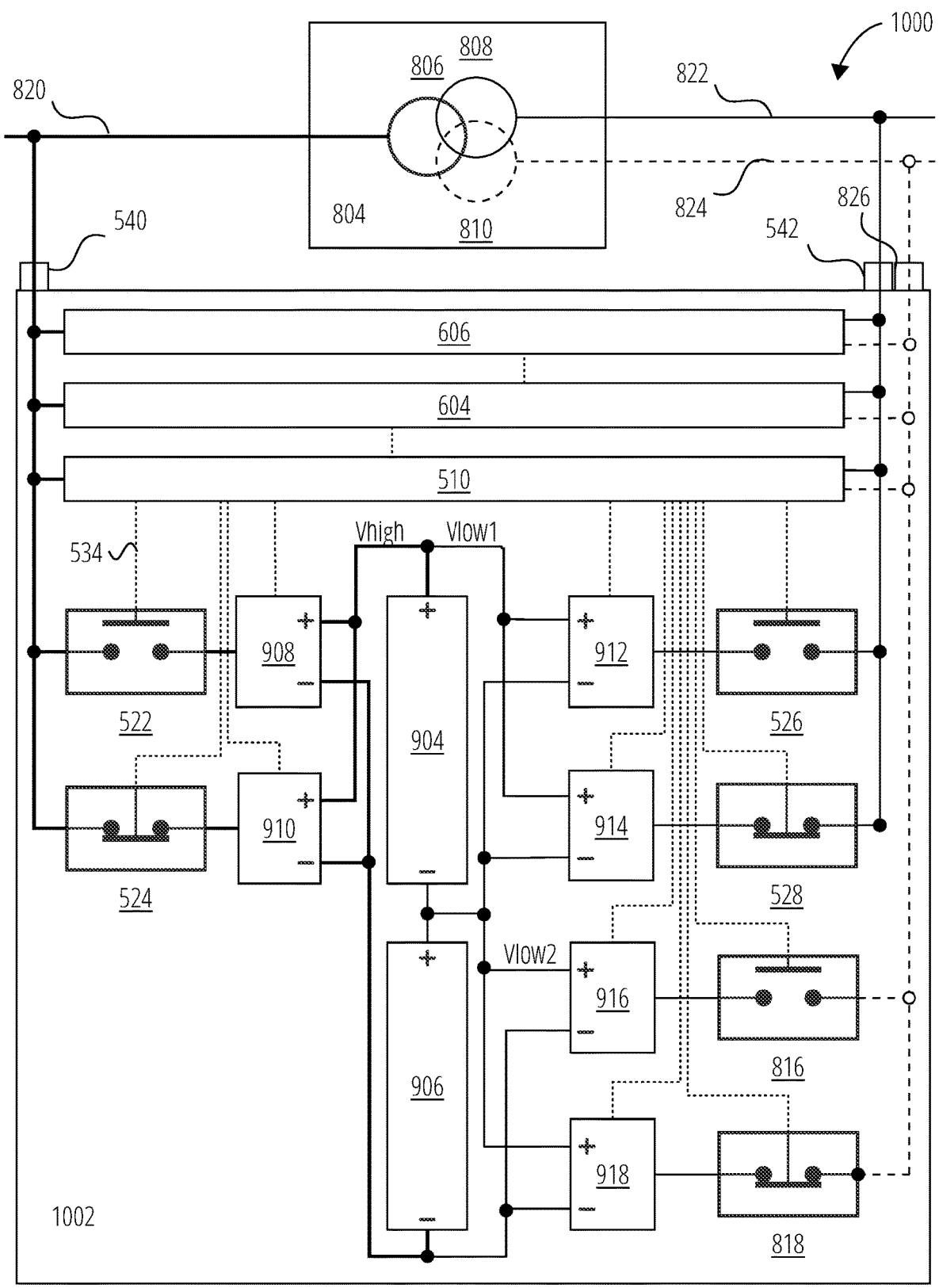
FIG. 10 illustrates an aspect of the subject matter in accordance with one embodiment.

FIG. 10 illustrates a novel system with energy storage 1000 in accordance with one embodiment. The energy storage device 1002 of FIG. 10 may comprise the same components as described for the energy storage device 902 introduced in FIG. 9. However, instead of having Vlow1 and Vlow2 both connect to a secondary winding 508 of a step-down transformer 504, the switches may be configured in such a way that switch 526 and switch 528 control charging from and discharging to the secondary winding 808, and switch 816 and switch 818 control charging from and discharging to the second low tertiary winding 810, both windings being part of the step-down transformer 804 first introduced in FIG. 8.

Note that DC charge storage unit 904 and DC charge storage unit 906 may be configured such that Vlow1 and Vlow2 are close to equal, but if needed for the appropriate voltage levels on first low voltage side 822 and second low voltage side 824, DC charge storage unit 904 and DC charge storage unit 906 respectively may produce Vlow1 and Vlow2 as unequal voltages. The sum of these voltages may still be equal to the Vhigh produced by the series configuration of DC charge storage unit 904 and DC charge storage unit 906.

Figure 11:
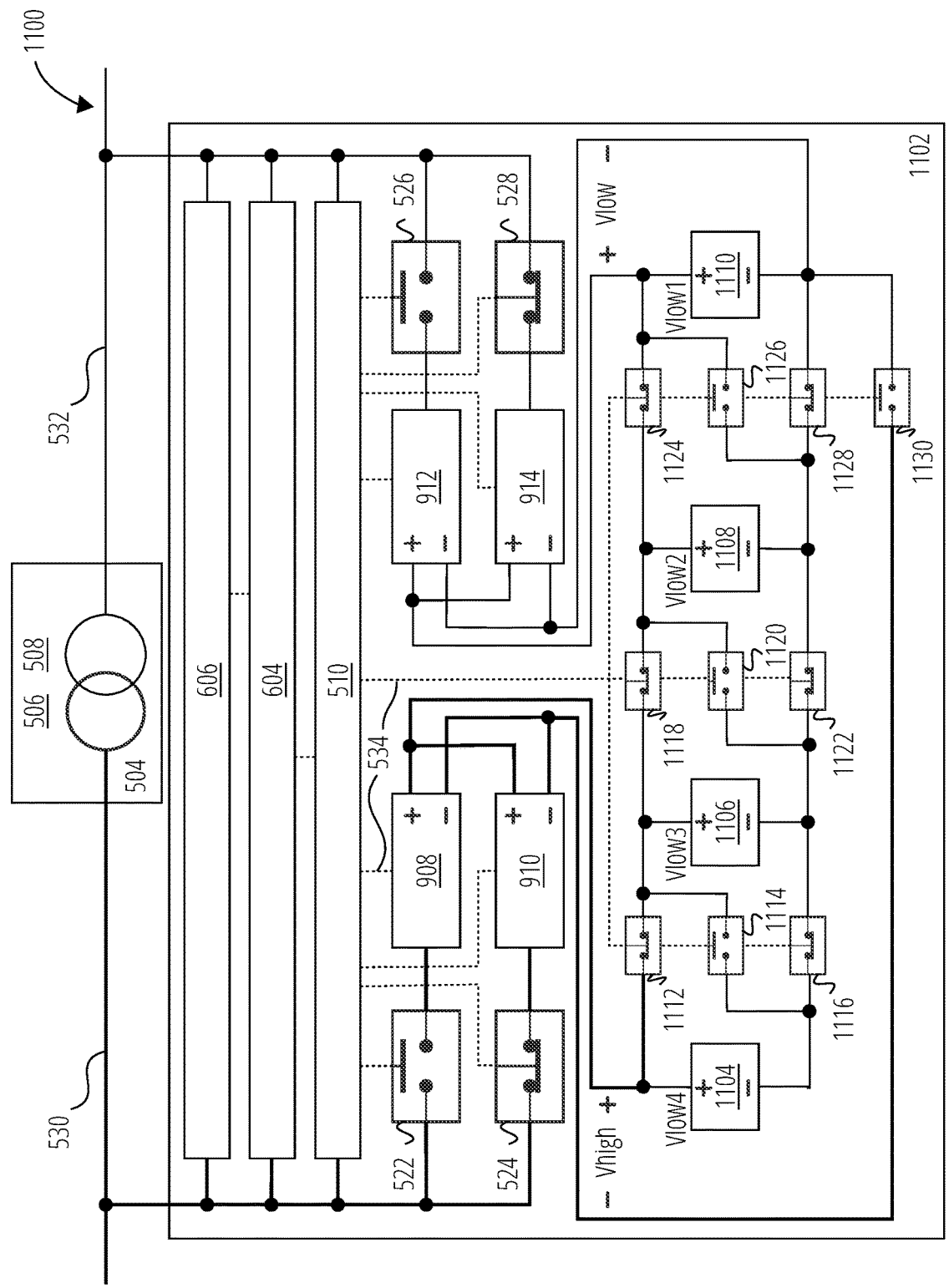
FIG. 11 illustrates an aspect of the subject matter in accordance with one embodiment.

FIG. 11 depicts a novel system with energy storage 1100 in accordance with one embodiment. The energy storage device 1102 of the novel system with energy storage 1100 comprises a number of components in common with previously described embodiments. However, in place of the DC charge storage unit 904 and DC charge storage unit 906 introduced in FIG. 9, the energy storage device 1102 comprises an array including DC charge storage unit 1104, DC charge storage unit 1106, DC charge storage unit 1108, and DC charge storage unit 1110. These charge storage units may be dynamically configured by a number of switches controlled using control signals 534 from charge/discharge logic 510.

These switches comprise switch 1112, switch 1114, switch 1116, switch 1118, switch 1120, switch 1122, switch 1124, switch 1126, switch 1128, and switch 1130, as shown. The switches may be configured to connect the four charge storage units illustrated in a variety of ways to the AC to DC converter 908, DC to AC converter 910, AC to DC converter 912, and DC to AC converter 914. In this manner, Vhigh may be dynamically adjusted as appropriate for connection to the high voltage side 530 and primary winding 506 through the AC to DC converter 908 and the DC to AC converter 910, and Vlow may be dynamically adjusted as appropriate for connection to the low voltage side 532 and secondary winding 508 through the AC to DC converter 912 and the DC to AC converter 914.

Figure 12:
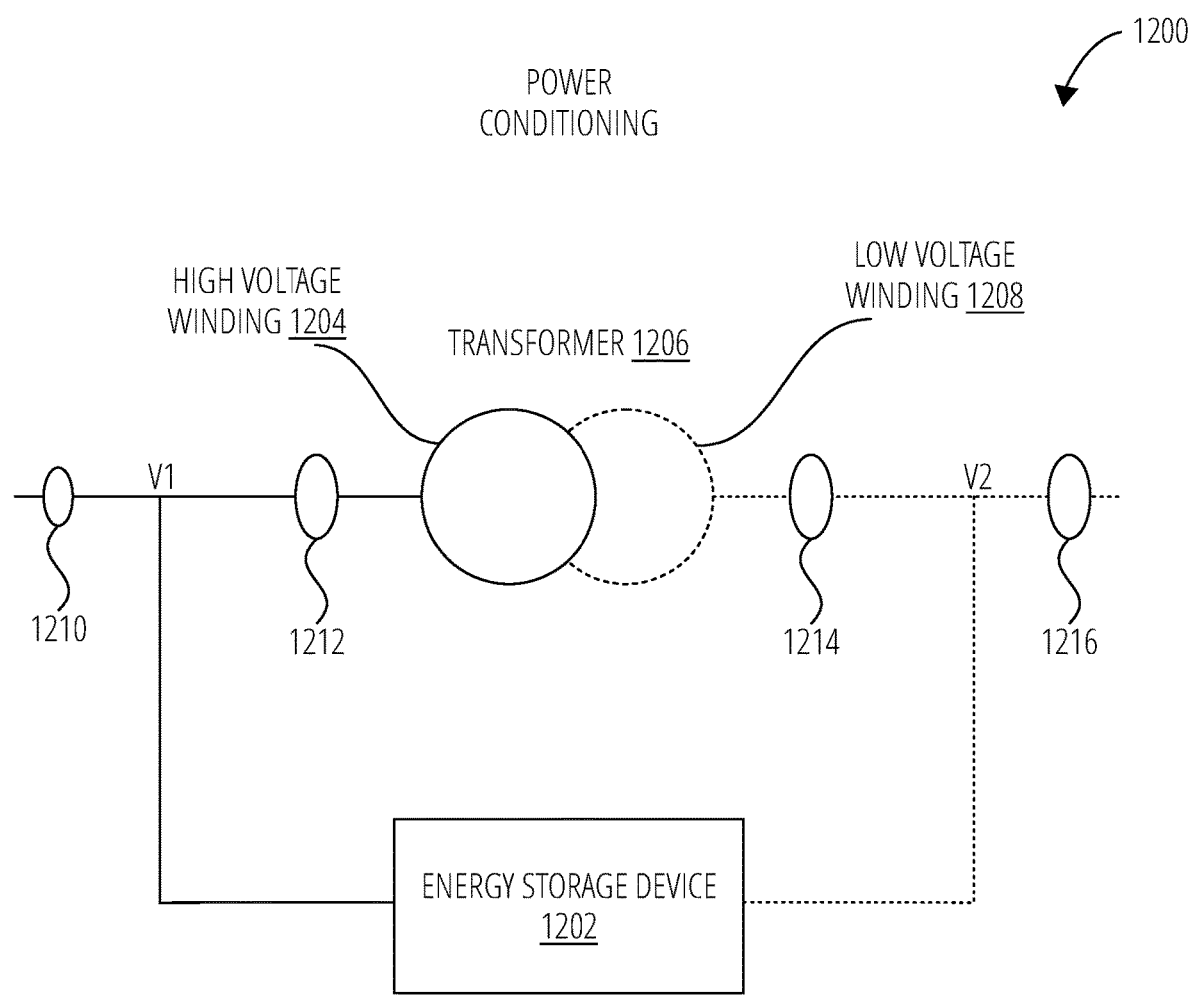
FIG. 12 illustrates a power conditioning 1200 in accordance with one embodiment.

FIG. 12 depicts power conditioning 1200 in accordance with one embodiment. The power conditioning 1200 is facilitated by supplying power from energy storage device 1202 or drawing power into energy storage device 1202 at either winding of the transformer 1206. Power may be conditioned by simultaneously drawing power from one winding of the transformer and delivering power to the other winding of the transformer. A low electrical resistance between the energy storage device 1202 and the transformer enables voltage to be sensed as a function of current through the charge (i.e., high voltage winding 1204 or V1) and discharge (i.e., low voltage winding 1208 or V2) circuits. These measurements may indicate voltage at the connections between the transformer 1206 and the energy storage device 1202.

Current may be sensed directly with auxiliary current sensors depicted as system V1 current sense 1210, transformer V1 current sense 1212, transformer V2 current sense 1214, and system V2 current sense 1216. These auxiliary current sensors may be in series or may be in parallel (ex. inductive) with the transformer 1206 terminals, the latter allowing installation without interrupting operation. An alternate current sensing topology is to measure system current to the transformer 1206 and power generation facility 102 as a system. Transformer 1206 current is calculated as system current minus energy storage device 1202 current in this topology.

Examples of power conditioning 1200 that may be carried out include voltage regulation, power factor correction, noise suppression, and transient impulse protection. Based on a sensed voltage and/or current condition on one winding of the transformer 1206, the energy storage device 1202 may draw energy from one winding of the transformer 1206 and/or release energy to the other windings of the transformer 1206. Herein, "power factor" refers to the ratio of the real power absorbed by the load to the apparent power flowing through the grid to the load. A power factor of less than one indicates the voltage and current are not in phase, reducing the instantaneous product (power) of the two. Real power is the instantaneous product of voltage and current and represents the capacity of the electricity for performing work. Apparent power is the average product of current and voltage. Due to energy stored in the load and returned to the grid, or due to a non-linear load that distorts the wave shape of the current drawn from the grid, the apparent power may be greater than the real power. A negative power factor occurs when the load (e.g., the downstream power customer) generates power, which then flows back into the transmission lines.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

LISTING OF DRAWING ELEMENTS 100 conventional storage deployment in a power distribution grid
102 power generation facility
104 step-up transformer
106 transmission lines
108 substation step-down transformer
110 service transformer
112 transmission customer
114 sub-transmission customer
116 primary customer
118 secondary customer
120 substation energy storage
122 service energy storage
124 main grid lines
126 consumer grid lines
200 novel storage deployment in a power distribution grid
202 energy storage device
204 energy storage device
300 transformer delta configuration
302 first transformer
304 second transformer
306 third transformer
308 parallel-installed energy storage device
310 pole ground
312 light bulb
314 air conditioner
316 three-phase pump
400 conventional system with energy storage
402 energy storage device
404 step-down transformer
406 primary winding
408 secondary winding
410 charge/discharge logic
412 energy storage unit
414 converter from AC power to energy storage unit power
416 converter from energy storage unit power to AC power
418 switch
420 switch
422 high voltage side
424 low voltage side
426 control signals
428 charging loss
430 discharging loss
432 loss across transformer
500 novel system with energy storage
502 energy storage device
504 step-down transformer
506 primary winding
508 secondary winding
510 charge/discharge logic
512 energy storage unit
514 converter from AC power to energy storage unit power
516 converter from energy storage unit power to AC power
518 converter from AC power to energy storage unit power
520 converter from energy storage unit power to AC power
522 switch
524 switch
526 switch
528 switch
530 high voltage side
532 low voltage side
534 control signals
536 charging loss
538 discharging loss
540 first power port
542 second power port
600 novel system with energy storage
602 energy storage device
604 signal conditioning logic
606 transformer winding monitor
702 energy storage device
704 step-down transformer
706 primary winding side
708 secondary winding side
710 switch
712 switch
714 switch
716 switch
800 novel system with energy storage
802 energy storage device
804 step-down transformer
806 primary winding
808 secondary winding
810 tertiary winding
812 converter from AC power to energy storage unit power
814 converter from energy storage unit power to AC power
816 switch
818 switch
820 high voltage side
822 first low voltage side
824 second low voltage side
826 third power port 900 novel system with energy storage
902 energy storage device
904 DC charge storage unit
906 DC charge storage unit
908 AC to DC converter
910 DC to AC converter
912 AC to DC converter
914 DC to AC converter
916 AC to DC converter
918 DC to AC converter
1000 novel system with energy storage
1002 energy storage device
1100 novel system with energy storage
1102 energy storage device
1104 DC charge storage unit
1106 DC charge storage unit
1108 DC charge storage unit
1110 DC charge storage unit
1112 switch
1114 switch
1116 switch
1118 switch
1120 switch
1122 switch
1124 switch
1126 switch
1128 switch
1130 switch
1200 power conditioning
1202 energy storage device
1204 high voltage winding
1206 transformer
1208 low voltage winding
1210 system V1 current sense
1212 transformer V1 current sense
1214 transformer V2 current sense
1216 system V2 current sense

What is claimed is:

1. A system comprising:
a transformer in an alternating current (AC) power distribution grid, the AC power distribution grid comprising a first side and a second side; and
an energy storage device in parallel with each winding of the transformer, wherein the energy storage device comprises:
at least one first power port coupled to a first winding of the transformer and coupled to the first side of the AC power distribution grid; and
at least one second power port coupled to a second winding of the transformer and coupled to a second side of the AC power distribution grid.

2. The system of claim 1, the energy storage device further comprising a first switch to selectively charge from the first power port and a second switch to selectively discharge to the second power port.

3. The system of claim 2, the energy storage device further comprising a switch to selectively discharge to the first power port.

4. The system of claim 2, the energy storage device further comprising a switch to selectively charge from the second power port.

5. The system of claim 1, the energy storage device further comprising a transformer winding monitor connected between the at least one first power port and the at least one second power port.

6. The system of claim 1, wherein the energy storage device is a multi-phase device with a separate power port for each winding.

7. The system of claim 5, further comprising logic to perform signal conditioning on at least one of the at least one first power port and the at least one second power port.

8. The system of claim 7, wherein the signal conditioning comprises harmonic distortion correction.

9. The system of claim 7, wherein the signal conditioning comprises power factor improvement.

10. The system of claim 1, wherein the energy storage device comprises two or more banks of batteries arranged in series to provide at least one high-voltage output when connected to the at least one first power port via at least one first DC to AC conversion circuit, and one or more of the two or more banks of batteries arranged in parallel to provide at least one low-voltage output when connected to the at least one second power port via at least one second DC to AC conversion circuit.

11. An energy storage device comprising:
two or more banks of charge storage units arranged in series to supply a high-voltage terminal, and the two or more banks of charge storage units arranged in parallel to supply two or more low-voltage terminals;
the high-voltage terminal connected to a first energy conversion device connected to a first winding of a transformer, thereby forming a first connected winding; and
one or more of the low-voltage terminals each connected to at least one second energy conversion device connected to a winding other than the first winding of the transformer, thereby forming one or more second connected windings, wherein the energy storage device is configured to allow simultaneous operation of the high-voltage terminal and the one or more low-voltage terminals.

12. The energy storage device of claim 11, further comprising a switch to selectively charge the two or more banks of charge storage units from the high-voltage terminal and switches to selectively discharge the two or more banks of charge storage units to the one or more low-voltage terminals.

13. The energy storage device of claim 11, further comprising a transformer winding monitor for the first connected winding and the one or more second connected windings.

14. The energy storage device of claim 13, further comprising signal conditioning logic to perform harmonic distortion correction on signals passing between the first connected winding and the one or more second connected windings.

15. The energy storage device of claim 13, further comprising signal conditioning logic to perform power factor improvement on signals passing between the first connected winding and the one or more second connected windings.

16. The energy storage device of claim 11, further comprising a first switch to selectively discharge the charge storage units to the high-voltage terminal and at least one second switch to selectively charge the charge storage units from each low-voltage terminal.

17. A method comprising:
operating an energy storage device in parallel with each winding of a transformer in a power distribution grid, the power distribution grid comprising a high-voltage side and a low-voltage side, wherein the transformer comprises high-voltage windings and low-voltage windings, and the energy storage device comprises:

at least one high-voltage power port coupled to one of the high-voltage windings of the transformer; and at least one low-voltage power port coupled to one of the low-voltage windings of the transformer.

18. The method of claim 17, further comprising operating a first switch to selectively charge the energy storage device from the high-voltage side of the power distribution grid and operating a second switch to selectively discharge the energy storage device to the low-voltage side of the power distribution grid.

19. The method of claim 17, further comprising operating a first switch to selectively discharge the energy storage device to the high-voltage side of the power distribution grid operating a second switch to selectively charge the energy storage device from the low-voltage side of the power distribution grid.

20. The energy storage device of claim 11, wherein a bank of charge storage units comprises two or more charge storage units configured and interconnected between at least a first connection point and a second connection point, the configuration of the two or more charge storage units including at least one of:

a parallel arrangement between the first connection point and the second connection point; and a series arrangement between the first connection point and the second connection point.

* * * * *